(12) United States Patent
Smithson et al.

(10) Patent No.: US 8,775,937 B2
(45) Date of Patent: Jul. 8, 2014

(54) USER INTERFACES AND SYSTEMS AND METHODS FOR USER INTERFACES

(75) Inventors: Alan Smithson, Mississauga (CA); Pablo Daniel Martin, San Juan, CA (US)

(73) Assignee: Smithsonmartin Inc., Mississauga, Ontario (CA)

( * ) Notice: Subject to any disclaimer, the term of this patent is extended or adjusted under 35 U.S.C. 154(b) by 298 days.

(21) Appl. No.: 13/152,761

(22) Filed: Jun. 3, 2011

(65) Prior Publication Data

US 2012/0311442 A1  Dec. 6, 2012

(51) Int. Cl.
*G06F 3/00* (2006.01)
*G06F 3/048* (2013.01)

(52) U.S. Cl.
USPC ............................ 715/716; 715/751; 715/754

(58) Field of Classification Search
USPC .......................................... 715/716, 751, 764
See application file for complete search history.

(56) References Cited

U.S. PATENT DOCUMENTS

| | | | |
|---|---|---|---|
| 4,868,765 A | 9/1989 | Diefendorff | |
| 6,331,840 B1 * | 12/2001 | Nielson et al. | 345/1.1 |
| 6,986,107 B2 | 1/2006 | Hanggie et al. | |
| 7,369,665 B1 | 5/2008 | Cheng | |
| 8,169,410 B2 * | 5/2012 | Hashimoto et al. | 345/173 |
| 8,194,043 B2 * | 6/2012 | Cheon et al. | 345/173 |
| 8,337,304 B2 * | 12/2012 | Yoshino et al. | 463/32 |
| 8,368,616 B1 * | 2/2013 | Harris | 345/1.1 |
| 8,386,965 B2 * | 2/2013 | Fleizach et al. | 715/865 |
| 8,438,481 B2 * | 5/2013 | Lau et al. | 715/716 |
| 8,543,665 B2 * | 9/2013 | Ansari et al. | 709/218 |
| 2007/0061722 A1 | 3/2007 | Kronlund et al. | |
| 2008/0122796 A1 * | 5/2008 | Jobs et al. | 345/173 |
| 2010/0205301 A1 * | 8/2010 | Ansari et al. | 709/225 |
| 2010/0241711 A1 * | 9/2010 | Ansari et al. | 709/205 |

* cited by examiner

*Primary Examiner* — David Phantana Angkool
(74) *Attorney, Agent, or Firm* — Cantor Colburn LLP

(57) ABSTRACT

Various user interface systems and methods are disclosed. A primary software application has one or more primary user interfaces that include a data output region. Some primary user interfaces may also have primary input regions. A control application has one or more control interfaces in which control regions are provided. A user may use the input controls using a preferred input modality such as touch input. A primary user interface and a corresponding control interface are displayed in registration on a display screen of a computing system such that the data output region of the primary user interface and the control region of the control interface a simultaneously visible to a user. A software or hardware component within or coupled to the computing system may be controlled using the control interface. Data relating to the component is displayed in the output region.

19 Claims, 6 Drawing Sheets

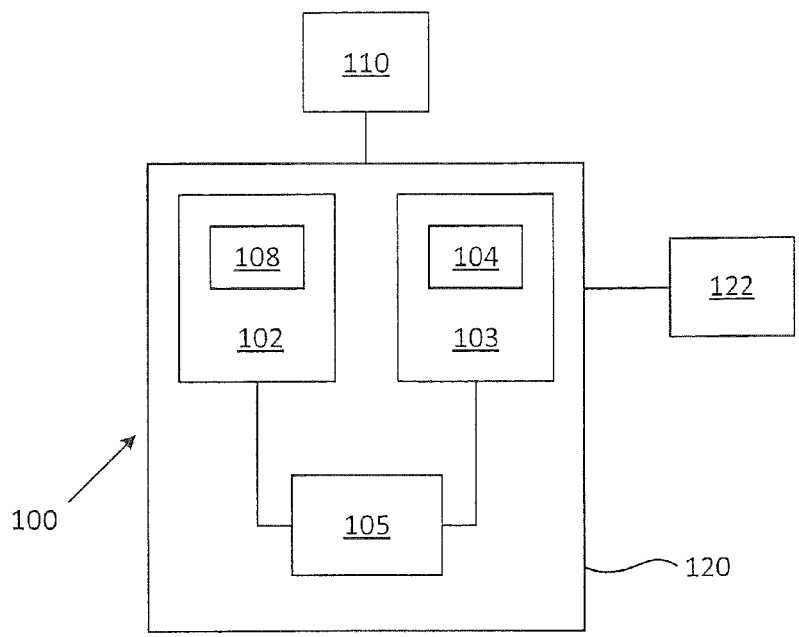
Figure 1
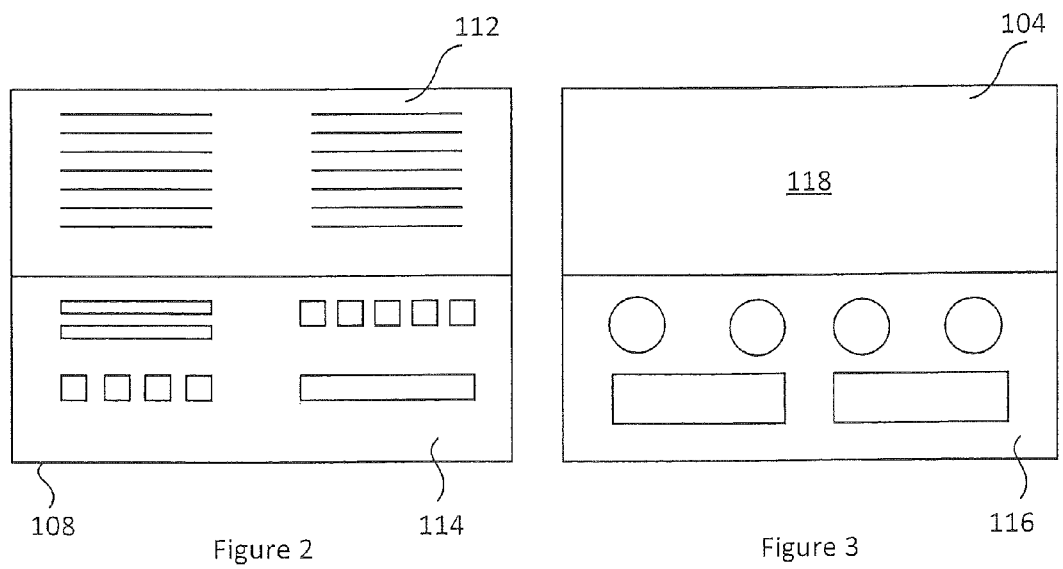
Figure 2
Figure 3

USER INTERFACES AND SYSTEMS AND METHODS FOR USER INTERFACES

FIELD

The described embodiments relate to user interfaces and systems and methods for providing and operating such user interfaces.

BACKGROUND

Many software applications operate on a computing system. Typically a computing system includes a processor and a display device. The software application operates on or is executed by the processor. Many software applications have a graphical user interface that is displayed on the display device. Typically, a graphical user interface allows a user to obtain information from and provide control inputs to the software application. For example, many graphical user interfaces include control inputs. For example, control inputs may include text fields, buttons, dials and other elements that a user may operate using a computer mouse or other input device. A graphical user interface may also include data outputs that provide information to the user.

Other software applications may have a graphical user interface that only provides graphic data outputs for use by a user but may not provide graphic input fields. A user may be required to provide text inputs or other inputs (such as inputs from an external control pad or remote device) to provide inputs to the software applications.

In general, software applications having a graphical user interface allow a user to control a component. In some cases, the component may be part of the software application itself. For example, some software applications that have graphical user interfaces may be generally independent applications that provide a service or utility to a user. For example, a word processing or graphics application may be an independent application that is used to create text documents without interacting with other software applications. The graphical user interface may be used to manipulate a document component or a graphic component within the application.

Some software applications that provide a graphical user interface may allow control of a component that is not within the software application. For example, media control application may allow control of an external component such as a software based sound processor or display setting that changes the aspect ratio, color scheme or another aspect of a display.

Some software applications that provide a graphical user interface may provide control of a hardware component coupled to a computing system in which the software application is operating. For example, a graphical user interface may be used to control a peripheral component such as a graphics card, settings of a display monitor, a music reproduction or processing system coupled to the computing system through a wired or wireless coupling or any other type of controllable peripheral component.

In many case, the graphical user interface provided with a software application cannot practically be used with a variety of input technologies. For example, the graphical user interface of many software applications is not practically usable with a touchscreen interface, which may be desirable for users having a computing system with a touchscreen display device. The graphical user interface of some applications cannot practically be used solely with a keyboard, which may be desirable for users who cannot easily use a mouse or who prefer to use only a keyboard for input. It is desirable to provide a user interface system and method that allows a user to control an application or to control components controlled by an application using alternate input controls rather than the control inputs provided with the native user interface of a software application.

In some situations, a user may wish to use an alternate input controls to provide inputs to control a software application or to control a component controlled by the software application. At the same time, the user may wish to view data outputs from the software application. It is desirable to provide alternate input controls that may be used in conjunction with the data output of the software application.

SUMMARY

In a first aspect, at least some of the embodiments described herein provide a user interface system for controlling at least one component, the system comprising: a primary software application having a primary user interface, wherein the primary user interface includes one or more primary data output regions for displaying output data relating to the component; and a control application having a control interface for controlling the component, wherein the control interface includes one or more control input regions for inputting control inputs, wherein the control interface is configured to be display in registration with the primary user interface such that the primary data output regions and control input regions are simultaneously visible.

In some embodiments, the control application may be provided for the primary or sole purpose of providing the control interface.

In some embodiments, the control interface is a touch enabled interface.

In some embodiments, the control interface is a multi-touch enabled interface.

In some embodiments, the primary user interface includes one or more primary input regions for controlling the component.

In some embodiments, the primary user interface is not designed for use with touch inputs and wherein the control interface is a touch enabled interface.

In some embodiments, the system further includes a computing system including a processor and a display device, wherein the primary application and the control application include a plurality of steps executed by the processor and wherein the primary user interface and the control interface are displayed on the display device.

In some embodiments, the component is responsive to one or more control variables stored in the computing system, wherein the control variables may be controlled by the control interface.

In some embodiments, the computing system includes a memory accessible to the control software application and the component. One or more control variables are stored in the memory and the component is responsive to the control variables.

In some embodiments, the control variables are transmitted to the component.

In some embodiments, the computing system includes a memory accessible to the primary software application, the control application and the component. One or more status variable are stored in the memory and the primary software application is responsive to the status variables to display information corresponding to the status variables in the data output regions.

In some embodiments, the status variables correspond to one or more operating conditions of the component.

In some embodiments, one or more control variables may be stored in the memory, and the component may be responsive to the control variables.

In some embodiments, at least some of the status variable and the control variables relate to a control protocol for controlling the component.

In some embodiments, the control protocol is selected from the group consisting of: Musical Interface Digital Interface (MIDI); Open Sound Control (OSC); User Datagram Protocol (UDP); mLAN protocol; digital multiplex (DMX); DMX512; transmission control protocol over internet Protocol (TCP/UP); UDP, TCP/IP, RS232.

In some embodiments, the component is a software component operating on the computing system.

In some embodiments, the component is a hardware component coupled to the computing system.

In some embodiments, the component is selected from the group consisting of: one or more music processing components; one or more music reproduction components; one or more show control components; one or more lighting control components; one or more special effects components; one or more sound design components; one or more recording system components; one or more audio processor components; and a combination of such components.

In some embodiments, the primary application is a music control software application; the primary data output regions provide information relating to a music asset; and the control interface includes control inputs for controlling reproduction of the music asset such as a music track.

In some embodiments, the primary user interface includes one or more primary controls. The control interface and the primary user interface are displayed at least some of the primary controls are concealed.

In some embodiments, the primary user interface includes a plurality of primary user interface views. At least some of the primary user interface views include one or more primary data output regions and the control interface includes one or more control inputs for switching between different primary user interface views.

In some embodiments, the control interface includes a plurality of control interface views having one or more control input regions and at least some of the control interface views being configured to be displayed in registration with the primary user interface such that the primary data output regions and control input regions are simultaneously visible.

In some embodiments, the system includes a plurality of primary software applications each having a primary user interface with one or more data output regions. The control interface includes a plurality of control interface views having one or more control input regions. At least one of the control interface views being configured to be displayed in registration with each of the primary user interfaces such that control input regions of the displayed control interface and the primary data output regions of the displayed primary user interface are simultaneously visible.

In some embodiments, the primary user interface includes a plurality of primary user interface views, at least some of the primary user interface views including one or more primary data output regions; and the control interface includes a plurality of control interface views having one or more control input regions. At least some of the control interface views are configured to be displayed in registration with one or more of the primary user interface views such that the control input regions of the displayed control interface view and the primary data output regions of the displayed primary user interface view are simultaneously visible.

In some embodiments, the control interface includes one or more apertures. The control interface is configured to be displayed such that the apertures are in registration with at least some of the primary data output regions.

In some embodiments, the primary user interface includes one or more primary input regions having primary control inputs for controlling the component. At least part of a primary input region is visible through an aperture. The visible control inputs may be used through the aperture to control the component.

In another aspect, some of the embodiments described herein provide a user interface method comprising: providing a computing system including a processor and a display device; operating a primary application on the computing system. The primary application controls a component and includes a primary user interface displayed on the display device and wherein the primary user interface includes one or more primary data output regions; operating a control application on the computing system, wherein the control application includes a control interface and wherein the control interface includes one or more control input regions displayed on the display device; and displaying the control interface in registration with the primary user interface such that the primary data output regions and the control input regions are simultaneously visible.

In some embodiments, the control interface is a touch enabled interface and a user may control the component using touch inputs.

In some embodiments, the control interface is a multi-touch enabled interface and a user may provide to inputs to the component simultaneously using touch inputs.

In some embodiments, the primary user interface includes one or more primary input regions for controlling the component.

In some embodiments, the primary user interface is not designed for use with touch inputs and the control interface is a touch enabled interface.

In some embodiments, the method further comprises changing one or more control variables stored in the computing system in response to inputs received at the control interface.

In some embodiments, the component is responsive to the one or more control variables.

In some embodiments, the method further comprises transmitting the one or more control variables to the component.

In some embodiments, the method further comprises storing the one or more control variables in a memory in the computing system.

In some embodiments, the method further comprises storing one or more status variables in the computing system. The status variables correspond to one or more operating conditions of the component.

In some embodiments, the method further comprises displaying information corresponding to one or more status variable in a data output region.

In some embodiments, the method further comprises changing one or more control variables stored in the computing system in response to inputs received at the control interface.

In some embodiments, the method further comprises changing one or more control variables stored in the computing system in response to inputs received at the control interface.

In some embodiments, at least some of the control variable and status variables relate to a control protocol for controlling the component.

In some embodiments, the method further comprises operating the component as a software component of the primary software application.

In some embodiments, the method further comprises operating the component as a software component on the computing system.

In some embodiments, the method further comprises coupling the component to the computing system.

In some embodiments, the primary application is a music control software application and the primary data output regions provide information relating to a music asset, and further including controlling reproduction of the music asset using the control inputs on the control interface.

In some embodiments, the primary user interface includes one or more primary controls and wherein displaying the control interface in registration with the primary user interface includes concealing at least some of the primary controls when the control interface and the primary user interface are displayed.

In some embodiments, the primary user interface includes one or more primary controls and wherein when the control interface and the primary user interface are simultaneously displayed, at least some of the primary controls are concealed.

In some embodiments, the method further comprises providing the primary user interface with a plurality of primary user interface views, at least some of the primary user interface views including one or more primary data output regions and providing the control interface with one or more control inputs for switching between different primary user interface views.

In some embodiments, the method further comprises providing the control interface with a plurality of control interface views having one or more control input regions; and displaying at least two of the control interface views in registration with the primary user interface such that the primary data output regions and control input regions of the displayed control interface view are simultaneously visible.

In some embodiments, the method further comprises providing a plurality of primary software applications each having a primary user interface with one or more data output regions, wherein the control interface includes a plurality of control interface views having one or more control input regions; and displaying at least two of the control interface views in registration with a corresponding primary user interfaces such that control input regions of the displayed control interface and the primary data output regions of the displayed primary user interface are simultaneously visible.

In some embodiments, the method further comprises providing the primary user interface with a plurality of primary user interface views, at least some of the primary user interface views including one or more primary data output regions; providing the control interface with a plurality of control interface views having one or more control input regions; and displaying at least two of the control interface views are configured to be displayed in registration with corresponding the primary user interface views such that the control input regions of the displayed control interface view and the primary data output regions of the displayed primary user interface view are simultaneously visible.

In some embodiments, the method further comprises providing the control interface with one or more apertures and displaying the control interface such that at least some of the primary data output regions are visible through the apertures.

In some embodiments, the method further comprises providing the primary user interface with one or more primary input regions having primary control inputs for controlling the component, wherein at least part of a primary input region is visible through an aperture and wherein the visible control inputs may be used through the aperture to control the component.

These and other aspects are identified and described in the following description of various example embodiments.

BRIEF DESCRIPTION OF THE DRAWINGS

Various embodiments of the invention will now be described with reference to the drawings, in which:

FIG. 1 illustrates an embodiment of a user interface system;

FIG. 2 illustrates a primary user interface of the system of FIG. 1;

FIG. 3 illustrates a control interface of the system of FIG. 1;

FIG. 10*c* illustrate the primary user interface and control interface of FIGS. 10*a* and 10*b* displayed on a display device.

The drawings are illustrative only and are not drawn to scale. Various elements of some embodiments may not be shown for clarity. Similar and corresponding elements of the various embodiments are identified by similar reference numerals.

DESCRIPTION OF EXEMPLARY EMBODIMENTS

Figure 4:
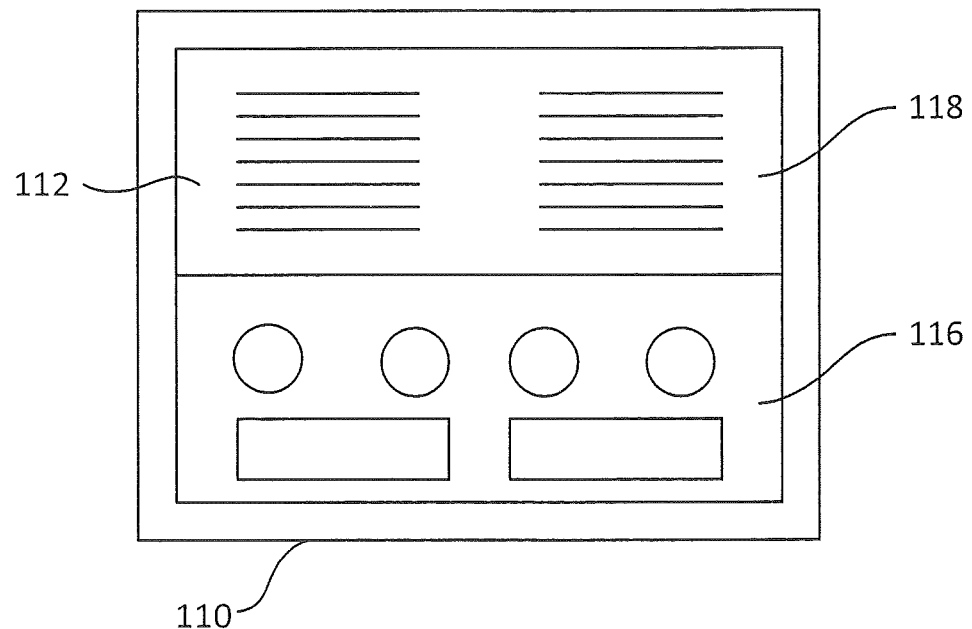
FIG. 4 illustrates the primary user interface and control interface of FIGS. 2 and 3 displayed in registration on a display device.

Numerous specific details are set forth in order to provide an understanding of the exemplary embodiments described herein. However, it will be understood by those of ordinary skill in the art that the embodiments described herein may be practiced without these specific details. In some instances, well-known methods, procedures and components have not been described in detail so as not to obscure the embodiments described herein. Furthermore, this description is not to be considered as limiting the scope of the embodiments described herein in any way, but rather as merely describing the implementation of several example embodiments.

The embodiments of the systems and methods described herein, and their component nodes, devices and systems, may be implemented in various computing systems that may incorporate various hardware or software devices and objects, or a combination of such devices and objects. However, preferably, these embodiments are implemented in computer programs executing on computing systems such as programmable computers each comprising at least one processor, a data storage system (including volatile and non-volatile memory and/or storage elements), at least one input device, and at least one output device.

For example and without limitation, the various computing devices may be a personal computer, laptop, personal data assistant, cellular telephone, smart-phone device, UMPC tablets and wireless hypermedia device or any other data processing or computing device. Program code is executed and applied to data to perform the functions described herein and generate output information. The output information may be provide or applied to one or more output devices, in known fashion.

Each program may be implemented in a high level procedural or object oriented programming and/or scripting language such as Flash or Java, for example, to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by or accessible to a general or special purpose programmable computer, for configuring and operating the computer when the storage media or device is read by the computer to perform the procedures described herein. In various embodiments, the computer program may be stored locally or at a location distant from the computing device. In some embodiments, the computer program may be stored on a device accessible through a local area network (LAN) or a wide area network such as the Internet. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, network based storage and the like. The computer useable instructions may also be in various forms, including compiled and non-compiled code.

Reference is first made to FIGS. 1-4, which illustrate a first embodiment of a user interface system 100. System 100 includes a primary software application 102, a control application 103 and a coordination module 105.

Primary software application 102 may be any type of software application that receives inputs from a user and which displays output data, which may be displayed in any form. The output data is displayed as part of a primary user interface 108 that is displayed on a display monitor 110. Primary user interface 108 is illustrated in FIG. 2. Primary user interface 108 is a graphical user interface and includes one or more primary application output regions 112. Primary application 102 generates and displays output data in the output regions 112. Graphical user interface 108 may optionally also include one or more primary input regions 114. Primary input regions 114 contain fields or controls with which a user may provide inputs to the primary application 102. For example, text entry fields and graphical controls such as buttons, dials and other user input elements may be displayed in an input region 114.

The control application 103 has a control interface 104, which is illustrated in FIG. 3. Control interface 104 is a graphical user interface and has one or more control regions 116. Control regions 116 include one or more fields or controls with which a user may provide inputs. The fields or controls may be any type of text entry fields, graphical controls or other user input elements. Control interface 104 includes one or more apertures 118 in which no objects are displayed. When control interface 104 is displayed on a display monitor, any graphic object aligned with the apertures 118 is visible through the apertures.

FIG. 4 illustrates control interface 104 and primary user interface 108 displayed on display monitor 110. Control interface 104 is designed such that the apertures 118 may be aligned or registered with the display of at least some of the output regions 112 of the primary user interface 108. Control interface 104 is displayed overlying and registered with primary user interface 108 such that the output regions 112 of primary user interface 108 are displayed through apertures 118. The primary input regions 114 of the primary user interface 108 are concealed by the control regions 116 of the control interface 104. A user of the user interface system is thus able provide control inputs by using the fields and controls in the control regions 116 and simultaneously view output data or information in the output regions 112.

User interface system 100 will typically operate on a computing system 120. The control interface 104 is operable to control a component 122. Component 122 may be a software component or a hardware component operating within or coupled to computing device 122. For example, component 122 may be a software component that operates on computing device 120 to provide a function or service. Component 120 is responsive to control inputs made by a user using control interface 104. Primary user interface 104 is adapted to display output data relating to the operation of component 122 in an output region 112.

The operation of primary software application 102, control interface 104 and component 122 is coordinated through coordination module 105. In some embodiments, coordination module 105 may be one or more data space or data structure that is accessible to primary software application 102, control interface 104 and component 122. For example, coordination module 105 may be a shared data structure that contains control variables or status variables or both relating to the operation of component 122. Control variable are input values that control the operation of component 122. Status variables are output values that describe the operation of component 122. Control interface 104 may be adapted to record or modify the control variables recorded in the shared data structure. Component 122 is responsive to the control variables and the operation of the component 122 varies in accordance with the control variables set or recorded by the control interface 104. Component 122 may record or modify the status variables to reflect the operation of component 122. Primary software application 102 monitors the status variables in the coordination module 105 and generates output data corresponding to the status variables.

Figure 5:
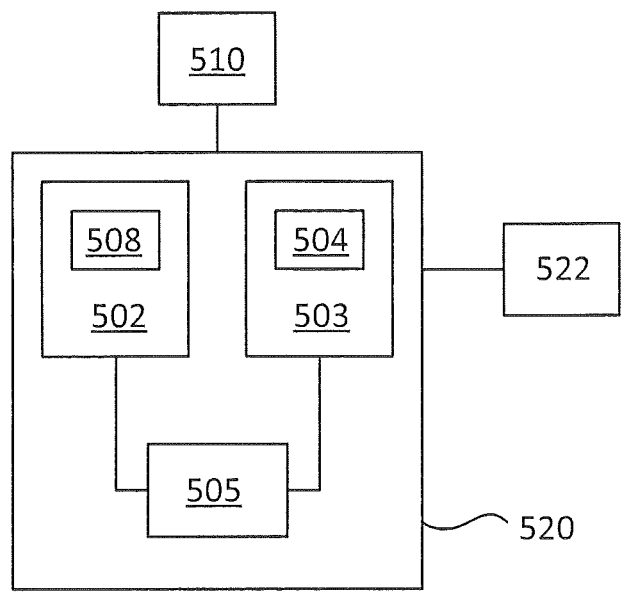
FIG. 5 illustrates another embodiment of a user interface system.

Reference is next made to FIG. 5, which illustrates a user interface system 500 for controlling the operation of a music or sound reproduction component. System 500 is similar to system 100 and corresponding elements are identified with corresponding reference numerals.

System 500 includes a primary software application 502, a control application 503 having a control interface 504, a coordination module 505 and a hardware component 522. Primary software application 502 and control application 503 are software applications that operate on a computing system 520. A display monitor 510 is coupled to computing system 520.

Hardware component 522 is a music reproduction system that is operated through a Musical Instrument Digital Interface (MIDI) protocol. Hardware component 522 is coupled to computing device 520. In some embodiments, hardware component 522 may be coupled to computing device 520 using a wired coupling such as a Universal Serial Bus (USB) cable and corresponding USB ports mounted on the computing system 520 and hardware component 522 or a special purpose MIDI cable and a corresponding MIDI ports or any other combination of cables and ports. In other embodiments, the hardware component 522 may be coupled to the computing device 520 through a wireless connection such a wireless local area network compliant with a communication standard such as IEEE 802.11 (commonly referred to as Wi-Fi™) Bluetooth™ or any other standard or proprietary protocol for coupling devices to allow them to communicate.

Hardware component 522 is responsive to MIDI control variables recorded in computing device 520 to reproduce audible sound. The MIDI control variables may specify the audio signal to be reproduced (such as a track, audio stream, audio transport stream, audio component of an audio/video transport stream or any other audio signal that can be reproduced by the hardware component 522), the volume at which the audio signal is to be reproduced, effects to be applied to the audio signal, the rate at which the audio signal is to be reproduced (for example, an accelerated or slowed reproduction of the audio signal), a portion of the audio signal to be repeated or looped and various other MIDI control variables.

The MIDI control variables may be transmitted to hardware component 522 in messages according to a MIDI protocol. In some embodiments, a protocol or interface application, which functions as the coordination module 505, may be provided and may operate on the computing system to provide a message passing service to receive and transmit control variable information from and to the primary software application the control application and the hardware component.

In various embodiments, a hardware component may receive messages describing control variable directly from the primary software application or the control application. In some embodiments, the control application may initially send a message to the primary software application corresponding to an input received at the control interface. The primary software application may then transmit a corresponding message containing a control variable based on the input to the component. The component is responsive to the control variable and, if appropriate, changes its operation to correspond to the input. Status variables may be shared through the transmission of messages in a similar manner. For example, a coordination module may receive messages containing status variables from a component and may transmit corresponding messages to the primary software application, which then displays corresponding information in a primary data region.

In some embodiments, the coordination module may include control variables or status variables or both that may be stored in a shared data space or data structure that is stored in a memory in the computing system and which is accessible to the primary software application, the control application or the component any combination of them. The coordination module may also receive or transmit some of control variables or status variables form and to the primary software application, the control application or the component or any combination of them.

Figure 6A:
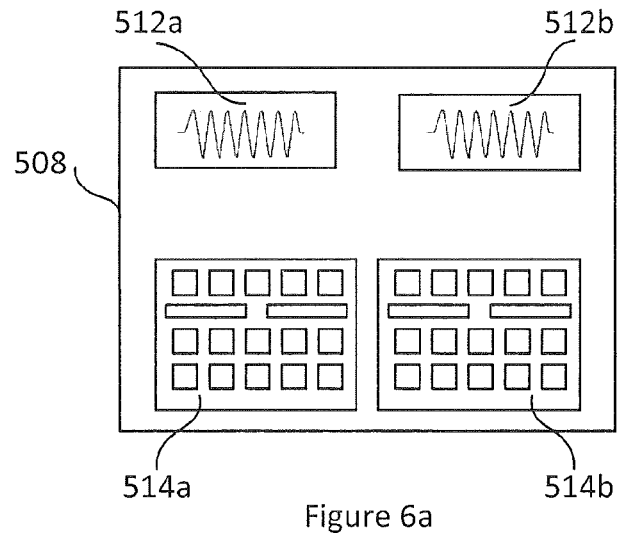
FIG. 6*a* illustrates a primary user interface of the system of FIG. 5.

In the example embodiment of FIG. 5, primary software application 502 is a disc jockey (DJ) software application that allows a user to select multiple audio assets or tracks recorded in the computing device 520 or in a storage medium accessible (not shown) accessible to the computing device 520. The primary software application provides a graphical primary user interface 508, which is illustrated in FIG. 6a. The illustrated primary user interface 508 allows a user to select and manipulate the reproduction of multiple audio tracks simultaneously. For each selected audio track, the primary user interface includes a primary input region 514 and an output region 512.

Each primary input region 514 containing a plurality of fields and controls that a user may manipulate with a computer mouse and keyboard. The fields and controls may allow the user to may control the reproduction of the selected audio track using the primary software application including the timing, volume, mixing of and between the selected tracks and other aspects. The selected track and the selected options and aspects for the reproduction of the tracks are recorded as MIDI control variables.

Hardware component 522 reproduces each selected track in accordance with the recorded MIDI control variables.

The output region 512 for each selected track is used to display information about the reproduction of the selected track. In FIG. 6a, each output region 512 illustrates a waveform corresponding to the selected track. In various embodiments, the primary software application may display various information in each output region 512.

Figure 6B:
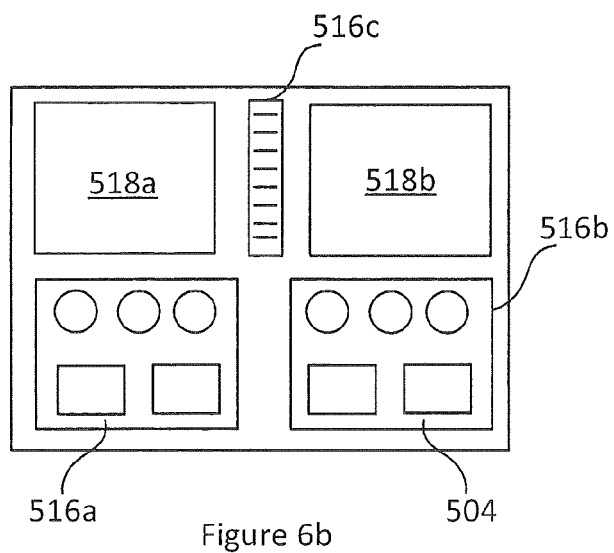
FIG. 6*b* illustrates a control interface of the system of FIG. 5.

Reference is made to FIG. 6b which illustrates control interface 504. Control interface has a plurality of control regions 516 and apertures 518. Control regions 516 provide various fields and controls are adapted for convenient use with a touchscreen and may be referred to as a touch enabled interface. For example, the various field and control may be sized and positioned such that they are readily usable with a finger or other pointer to manipulate the various fields and controls Some fields and controls may require keyboard input (which may be made using a physical keyboard coupled to the computing device 520 or a virtual keyboard displayed on display monitor 510). In the is example embodiment, the control interface is multi-touch enabled, allowing a user to simultaneously manipulate more than one control to simultaneously modify more than one control variable.

Figure 6C:
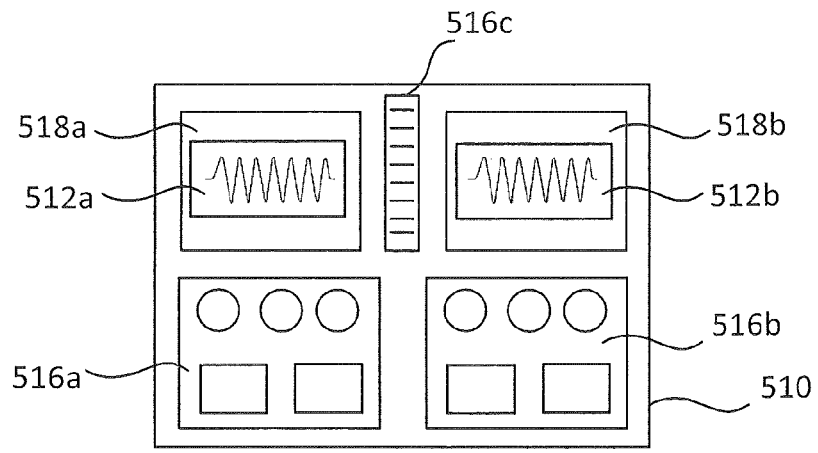
FIG. 6*c* illustrates the primary user interface and the control interface of FIGS. 6*a* and 6*b* illustrated on a display device.
Figure 7:
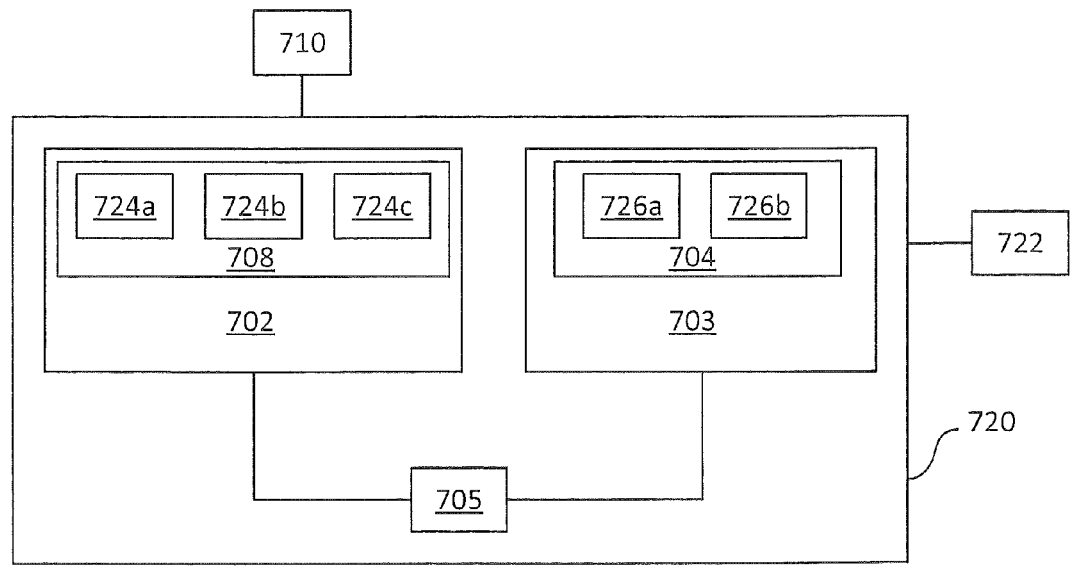
FIG. 7 illustrates another embodiment of a user interface system.
Figure 8A:
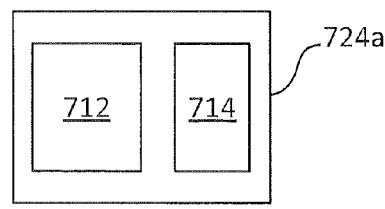
FIGS. 8*a*-8*c* illustrate several primary user interface views of the system of FIG. 7.
Figure 8D:
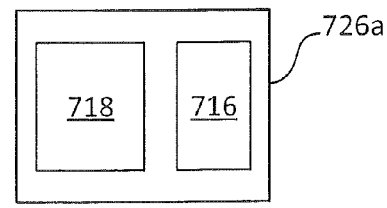
FIG. 8*d*-8*e* illustrate several control interface views of the system of FIG. 7.
Figure 8B:
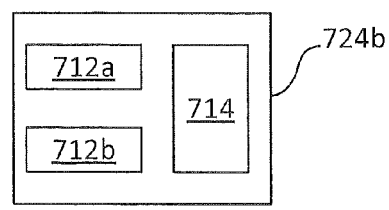
Figure 8E:
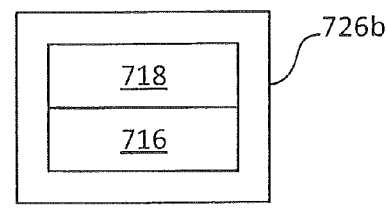
Figure 8C:
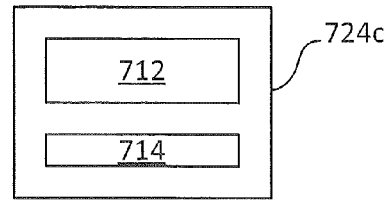

FIG. 6c illustrates the control interface 504 and primary user interface 508 on display monitor 510. The control regions 516 overlie and conceal the primary regions 514. Output regions 512 are visible through apertures 518. The combined display and user interface presented to a user allows the user to manipulate audio tracks using the control regions 516 of the control interface 504 and view information about the audio tracks using the output regions 512 of primary user interface 508.

The hardware component 522 is responsive to changes in MIDI control variables that may be changed using either the primary user interface 508 or the control interface 504. The output data illustrated in output regions 512 correspond to the MIDI control variables and may also correspond to MIDI status variables set by the hardware component. For example, in the example embodiment, the output data may include waveforms corresponding to the selected music tracks and other information about the selected music tracks and options for reproduction of the music tracks. As a result, the control interface 504 may be used to control the hardware component. Changes in the operation of the hardware component, or in at least some of the MIDI status variable are reflected in the display in the output regions 512.

System 500 allows a user to obtain information from a primary user interface 508 while controlling a component 522 with a control interface 504. Control interface 504 may be adapted to allow a user to more easily use the hardware component than with the primary input regions 514 of the primary user interface 508, or may provide an optional control interface that may be preferred by a user. For example, the primary user interface may not be designed for use with an input modality preferred by a user, such as touch inputs, while the control interface may provide the desired input modality.

In some embodiments, the coordination module may also allow the control interface to the control the operation of the primary software application. This may allow a user to access features of the primary software application through the control interface. For example, if the primary software application is a DJ software application, it may provide various sound effects and audio processing functions that may be used to modify or process an audio track before the track is provided to a component to be reproduced. The control interface may provide control inputs to the primary software application selecting such effects and functions and parameters for the effects and functions. The control inputs may be passed from the control interface to the primary software application through a shared memory or data structure, as described above in relation to system 500.

In various embodiments, the coordination module may synchronize or coordinate the primary software application and the control interface in various ways. For example, in some embodiments, the coordination module may simply provide a message passing facility that allows the control interface to pass control inputs to the primary software application. The primary software application may then control a component in response to the control inputs received from the control interface.

System 500 uses a MIDI control protocol to share control variables and status variables between the primary software application, the control application and the component. In other embodiments directed to control of a music related component a coordination module may implement any other protocol or method of coordination. For example, in some embodiments, other music related control protocols such as open sound control (OSC), mLAN protocol or other protocols may be used. In various embodiments, a coordination protocol or strategy protocols may be implemented by providing a coordination software application that records control variables and status variables.

Various embodiments may be directed to control of any type of software or hardware component. In some embodiments, one or more components may be controlled and monitored.

Reference is next made to FIGS. 7 and 8a-8e, which illustrate a user interface system 700. System 700 is similar to systems 100 and 500 and corresponding elements are identified by corresponding reference numerals.

System 700 includes a primary software application 702, a control application 703, a coordination module 705 and a component 722.

Software application 702 includes a primary user interface 708 that includes a plurality of primary interface views 724a, 724b and 724c. At least some of the primary interface views 724 include one or more output regions 712. The shape and position of the output regions 712 on the various primary interface views may be the same or may be different. Control application 703 includes a plurality of control interface views 726a, 726b each having one or more apertures 718. Each control interface view 726 corresponds to one or more of the primary interface view 724 such that when the control interface view 726 is displayed in registration with a corresponding primary interface view 724, at least some of the output regions on the primary interface view 724 are visible through an aperture 718. In FIGS. 8a-8e, control interface view 726a corresponds to primary interface view 724a and 724b, and control interface view 726 corresponds to primary interface view 724c.

In some embodiments, the primary interface views may include primary input regions 714, some or all of which may be concealed behind a control region 716 when displayed with a corresponding control interface view 726.

Figure 9:
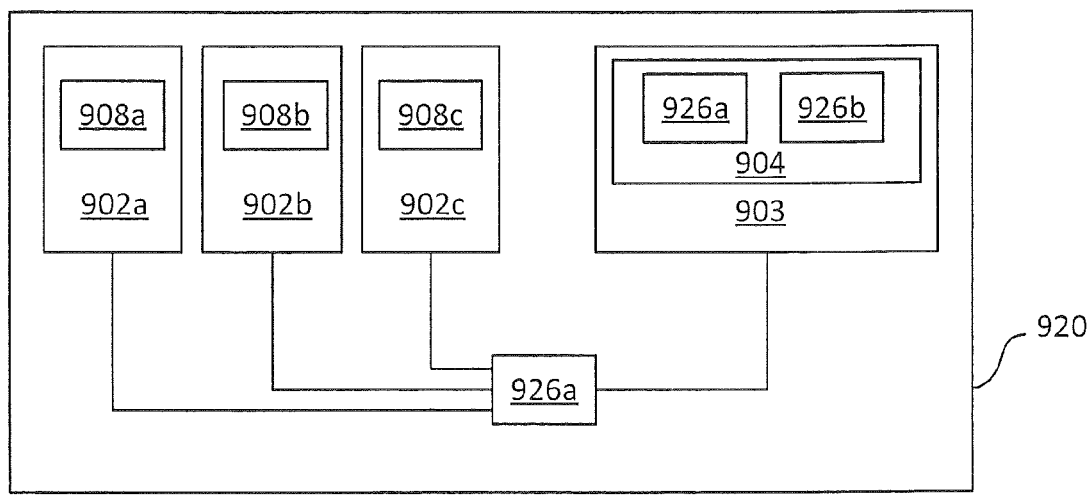
FIG. 9 illustrates another embodiment of a user interface system.

Reference is next made to FIG. 9, which illustrates a user interface system 900. System 900 is similar to system 700 and corresponding elements are identified by corresponding reference numerals.

System 900 includes a plurality of primary software applications 902a, 902b, . . . , a control application 703, a coordination module 705 and a component 722.

Each of the primary software applications 902 has a primary user interface 908 that may include one or more primary user interface views. The control application includes a plurality of control interface views 926, each of which includes one or more apertures to allow output regions on a corresponding primary user interface view to be visible through the apertures when the control interface view 926 and a corresponding primary user interface view are displayed together.

In some embodiments, some or all of the control interface views may include a control input to allow a user to change the display from one primary interface view to another primary interface view. In some embodiments, the control software application may be configured to display a corresponding control interface view when a different primary user interface view is displayed.

The control interfaces and control interface views of systems 100, 500, 700 and 900 have been described as having apertures through which one or more data regions of a corresponding primary user interface or primary user interface view is visible when corresponding control interface or control interface view and primary interface or primary user interface views are display in registration.

Figure 10A:
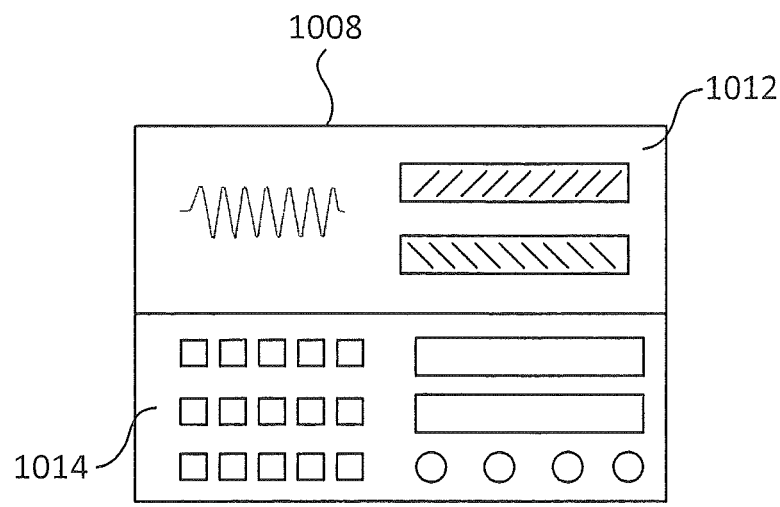
FIGS. 10*a* and 10*c* illustrate a primary user interface and a control interface according to another embodiment of a user interface system.
Figure 10B:
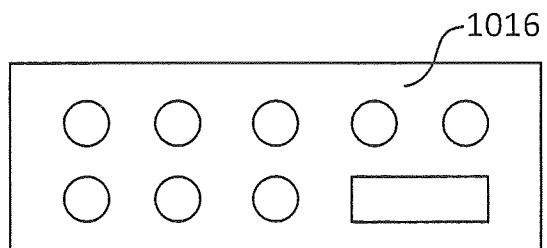
Figure 10C:
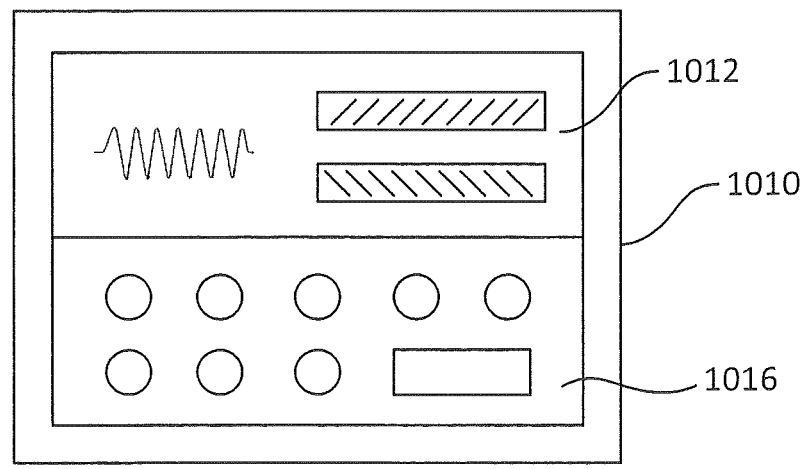

Reference is next made to FIGS. 10a-10c. FIG. 10a illustrates a primary user interface 1008 that has a data output region 1012. FIG. 10b illustrates a corresponding control interface 1004 having a control region 1016. FIG. 10c illustrates primary user interface 1008 and control interface on a display device 1110 in registration with one another. The control region 1016 and the data output region 1012 are simultaneously visible allowing a user to control a component with controls in the control region 1016 and to view data relating to the component in output region 1012. The control interface does not include any apertures.

Various embodiments have been described here by way of example only. Various modification and variations may be made to these exemplary embodiments without departing from the spirit and scope of the invention.

We claim:

1. A user interface system for controlling at least one component, the system comprising:
a primary software application having a primary user interface, wherein the primary user interface includes one or more primary input regions for controlling the component and one or more primary data output regions for displaying output data relating to the component;
a control application having a control interface for controlling the component, wherein the control interface includes one or more control input regions for inputting control inputs, and
a display device, wherein the primary user interface and the control interface are displayed on the display device, wherein the control interface is configured to be displayed on the display device in registration with the primary user interface such that the primary data output regions and control input regions are simultaneously visible and the control input regions overlie at least a portion of the primary input regions.

2. The user interface system of claim 1 wherein the control interface is a touch enabled interface.

3. The user interface system of claim 1 further including a computing system including a processor, wherein the primary software application and the control application include a plurality of steps executed by the processor.

4. The user interface system of claim 3 wherein the component is responsive to one or more control variables stored in the computing system, wherein the control variables may be controlled by the control interface.

5. The user interface system of claim 3 wherein the computing system includes a memory accessible to the control software application and the component and wherein one or more control variables are stored in the memory, and wherein the component is responsive to the control variables.

6. The user interface system of claim 4 wherein the control variables are transmitted to the component.

7. The user interface system of claim 3 wherein the computing system includes a memory accessible to the primary software application, the control application and the component, and wherein one or more status variable are stored in the memory, the primary software application is responsive to the status variables to display information corresponding to the status variables in the data output regions.

8. The user interface system of claim 7 wherein the status variables correspond to one or more operating conditions of the component.

9. The user interface system of claim 7 wherein one or more control variables are stored in the memory, and wherein the component is responsive to the control variables.

10. The user interface system of claim 9 wherein at least some of the status variable and the control variables relate to a control protocol for controlling the component.

11. The user interface system of claim 1 wherein the component is selected from the group consisting of:
   one or more music processing components;
   one or more music reproduction components;
   one or more show control components;
   one or more lighting control components;
   one or more special effects components;
   one or more sound design components;
   one or more recording system components;
   one or more audio processor components; and
   a combination of such components.

12. The user interface system of claim 1 wherein:
   the primary software application is a music control software application;
   the primary data output regions provide information relating to a music asset; and
   the control interface includes control inputs for controlling reproduction of the music asset.

13. The user interface system of claim 1 wherein the primary user interface includes one or more primary controls and wherein when the control interface and the primary user interface are displayed at least some of the primary controls are concealed.

14. The user interface system of claim 1 wherein:
   the primary user interface includes a plurality of primary user interface views, at least some of the primary user interface views including one or more primary data output regions; and
   the control interface includes one or more control inputs for switching between different primary user interface views.

15. The user interface system of claim 1 wherein the control interface includes a plurality of control interface views having one or more control input regions and at least some of the control interface views being configured to be displayed in registration with the primary user interface such that the primary data output regions and control input regions are simultaneously visible.

16. The user interface system of claim 1 including a plurality of primary software applications each having a primary user interface with one or more data output regions and wherein the control interface includes a plurality of control interface views having one or more control input regions and at least one of the control interface views being configured to be displayed in registration with each of the primary user interfaces such that control input regions of the displayed control interface and the primary data output regions of the displayed primary user interface are simultaneously visible.

17. The user interface system of claim 1 wherein:
   the primary user interface includes a plurality of primary user interface views, at least some of the primary user interface views including one or more primary data output regions; and
   the control interface includes a plurality of control interface views having one or more control input regions, wherein at least some of the control interface views are configured to be displayed in registration with one or more of the primary user interface views such that the control input regions of the displayed control interface view and the primary data output regions of the displayed primary user interface view are simultaneously visible.

18. The user interface system of claim 1 wherein the control interface includes one or more apertures and wherein the control interface is configured to be displayed such that the apertures are in registration with at least some of the primary data output regions.

19. The user interface system of claim 18 wherein the primary user interface includes one or more primary input regions having primary control inputs for controlling the component and wherein at least part of a primary input region is visible through an aperture and wherein the visible control inputs may be used through the aperture to control the component.

* * * * *